United States Patent [19]

Law et al.

[11] Patent Number: 4,922,018

[45] Date of Patent: May 1, 1990

[54] PHOTOCONDUCTIVE IMAGING MEMBERS WITH UNSYMMETRICAL SQUARAINE COMPOSITIONS

[75] Inventors: Kock-Yee Law, Fairport; F. Courtney Bailey, Webster, both of N.Y.

[73] Assignee: Xerox Corporation, Stamford, Conn.

[21] Appl. No.: 401,598

[22] Filed: Aug. 31, 1989

Related U.S. Application Data

[62] Division of Ser. No. 187,777, Apr. 29, 1988, Pat. No. 4,886,722.

[51] Int. Cl.$^5$ .............................................. C07C 87/45
[52] U.S. Cl. ................................. 564/307; 564/305; 564/381; 430/59; 430/74
[58] Field of Search .................. 564/381, 305, 307; 430/74, 59

[56] References Cited

U.S. PATENT DOCUMENTS

| | | | |
|---|---|---|---|
| 3,158,475 | 11/1964 | Cassiers et al. | 564/305 |
| 4,092,146 | 5/1978 | Fischer et al. | 71/70 |
| 4,415,639 | 11/1983 | Horgan | 430/57 |
| 4,523,035 | 6/1985 | Yanus | 564/307 |
| 4,552,822 | 11/1985 | Kazmaier et al. | 430/59 |
| 4,559,286 | 12/1985 | Kazmaier et al. | 430/59 |
| 4,585,895 | 4/1986 | Law | 564/307 |
| 4,607,124 | 8/1986 | Kazmaier et al. | 564/307 |
| 4,621,038 | 11/1986 | Kazmaier et al. | 430/59 |
| 4,624,904 | 11/1986 | Kazmaier et al. | 430/59 |

FOREIGN PATENT DOCUMENTS

| | | | |
|---|---|---|---|
| 745611 | 7/1970 | Belgium | 430/74 |

*Primary Examiner*—Glennon H. Hollrah
*Assistant Examiner*—Scott C. Rand
*Attorney, Agent, or Firm*—E. O. Palazzo

[57] ABSTRACT

Unsymmetrical squaraine compounds such as substituted dialkylaminophenylalkoxyaryl squaraines, and imaging members comprised of the aforementioned squaraines.

4 Claims, 1 Drawing Sheet

PHOTOCONDUCTIVE IMAGING MEMBERS WITH UNSYMMETRICAL SQUARAINE COMPOSITIONS

This is a division, of application Ser. No. 07/187,777, filed Apr. 29, 1988.

BACKGROUND OF THE INVENTION

This invention is generally directed to squaraine compositions, and to processes for the preparation thereof. More specifically, the present invention is directed to unsymmetrical squaraine compositions containing (poly)alkoxyarly substituents, which squaraines can be synthesized by cycloaddition-condensation processes, thereby avoiding the use of costly squaric acid as a reactant. In one embodiment of the present, invention there are provided unsymmetrical squaraine compositions containing (poly)methoxyphenyl substituents with improved xerographic properties, inclusive of high charge acceptance, low dark decay, high photosensitivity, and improved cyclic stability when these compositions are incorporated into photoconductive imaging members. Accordingly, in another embodiment of the invention of the present application there are provided imaging members with photoconductive layers comprised of the unsymmetrical squaraines illustrated herein, and charge or hole transport layers, especially those comprised of aryl amines, which members are sensitive to light in the wavelength region of from about 400 to about 1,000 nanometers. Therefore, the resulting members are responsive to visible light, and infrared illumination originating from laser printing apparatuses wherein, for example, gallium arsenide diode lasers are selected. The photoresponsive imaging members of the present invention can also, for example, contain situated between a photogenerating layer and a hole transporting layer, or situated between a photogenerating layer and a supporting substrate with a charge transport layer in contact with the photogenerating layer, a photoconductive composition comprised of the unsymmetrical squaraines illustrated herein.

Numerous different xerographic photoconductive members, including squaraines and processes thereof, are known, for example, a homogeneous layer of a single material such as vitreous selenium, or a composite layered device containing a dispersion of a photoconductive composition. An example of one type of composite xerographic photoconductive member is described, for example, in U.S. Pat. No. 3,121,006, wherein there are disclosed finely divided particles of a photoconductive inorganic compound dispersed in an electrically insulating organic resin binder. These members contain, for example, coated on a paper backing a binder layer containing particles of zinc oxide uniformly dispersed therein. The binder materials disclosed in this patent comprise a material such as polycarbonate resins, polyester resins, polyamide resins, and the like, which are incapable of transporting for any significant distance injected charge carriers generated by the photoconductive particles. Accordingly, as a result the photoconductive particles must be in a substantially continuous particle to particle contact throughout the layer for the purpose of permitting charge dissipation required for a cyclic operation. Thus, with the uniform dispersion of photoconductive particles described a relatively high volume concentration of photoconductor material, about 50 percent by volume, is usually necessary in order to obtain sufficient photoconductor particle to particle contact for rapid discharge. There are also known photoreceptor materials comprised of inorganic or organic materials wherein the charge carrier generating, and the charge carrier transport functions are accomplished by discrete contiguous layers. Additionally, layered photoreceptor materials are disclosed in the prior art, which include an overcoating layer of an electrically insulating polymeric material. Recently, there have been disclosed other layered photoresponsive devices including those comprised of separate generating layers, and transport layers as described in U.S. Pat. No. 4,265,990; and overcoated photoresponsive materials containing a hole injecting layer, overcoated with a hole transport layer, followed by an overcoating of a photogenerating layer; and a top coating of an insulating organic resin, reference U.S. Pat. No. 4,251,612. Examples of photogenerating layers disclosed in these patents include trigonal selenium, and phthalocyanines, while examples of transport layers include certain diamines as mentioned therein. Also, there is illustrated in U.S. Pat. No. 4,415,639, the disclosure of which is totally incorporated herein by reference, the use of known squaraine compositions, such as hydroxy squaraines, as a photoconductive layer in an infrared sensitive photoresponsive device. More specifically, there is described in this patent an improved photoresponsive device containing a substrate, a hole blocking layer, an optional adhesive interfacial layer, an inorganic photogenerating layer, a photoconductive composition capable of enhancing or reducing the intrinsic properties of the photogenerating layer, which photoconductive composition is selected from various squaraine compositions, including hydroxy squaraine compositions, and a hole transport layer. Other patents disclosing photoconductive devices with squaraines are U.S. Pat. No. 4,471,041; 4,486,520; 4,508,803; 4,507,580; 4,552,822; 4,390,610; 4,353,971; and 4,391,888.

Furthermore, there are illustrated in U.S. Pat. No. 4,624,904, the disclosure of which is totally incorporated herein by reference, photoconductive imaging members with unsymmetrical hydroxy squaraine compositions, and aryl amine hole transport layers. The aforementioned unsymmetrical squaraine compounds can be prepared, for example, by the initial preparation of an aryl cyclobutenedione intermediate, followed by the reaction thereof with a substituted aniline. More specifically, with respect to method A illustrated in the '904 patent, the aryl cyclobutenedione is prepared by heating with reflux at a temperature of from about 40° to about 50° C., depending on the solvent selected; about 20 millimoles to about 50 millimoles of substituted aniline; from about 60 millimoles to about 150 millimoles of dihalocyclobutenedione; and from about 100 milliliters to about 1,000 milliliters of Friedel-Crafts solvent inclusive of, for example, carbon disulfide, nitrobenzene or methylene chloride. This reaction is accomplished in the presence of from about 200 to about 900 millimoles of a catalyst such as aluminum chloride, and the resulting substituted aniline is reacted with a hydroxy substituted aniline in the present of an aliphatic alcoholic solvent. Subsequent to separation, there are obtained the desired unsymmetrical squaraine compounds of the formula as detailed on page 8, beginning at line 10, for example. Also, in copending application U.S. Ser. No. 557,795 there are described photoresponsive imaging members containing unsymmetrical squaraines comprised by forming a mixture of squaric acid, a primary alcohol, a first tertiary amine, and a second tertiary amine.

Furthermore, there are disclosed in several patents processes for preparing squaraine compositions. For example, in U.S. Pat. No. 4,524,220 there is illustrated a squaraine process by the reaction of squaric acid, and an aromatic aniline in the presence of an aliphatic amine. Also, in U.S. Pat. No. 4,524,219 there is described a process for the preparation of squaraines by the reaction of an alkyl squarate, and an aniline in the presence of aliphatic alcohol, and an optional acid catalyst. Moreover, disclosed in U.S. Pat. No. 4,524,218 are processes for the preparation of squaraines by the reaction of squaric acid with an aromatic amine, and a composition selected from the group consisting of phenols, and phenol squaraines, which reaction is accomplished in the presence of an aliphatic alcohol, and an optional azeotropic catalyst. Other processes for preparing squaraines are illustrated in U.S. Pat. No. 4,525,592, wherein there is described the reaction of a dialkyl squarate, and an aniline in the presence of an aliphatic alcohol, and an acid catalyst.

Although the above squaraines, and processes thereof are suitable for their intended purposes, there continues to be a need for other photoconductive unsymmetrical squaraines. Additionally, and more specifically there remains a need for simple, economical processes for preparing certain unsymmetrical squaraine compositions with stable properties, which when incorporated into photoconductive devices result in reduced dark decay characteristics, and increased charge acceptance values as compared to substantially similar squaraine compositions. Moreover, there remains a need for processes that enable the preparation of unsymmetrical squaraines wherein the use of costly squaraic acid component reactants are avoided. In addition, there remains a need for photoconductive imaging members with certain stable electrical characteristics, that is for example the aforementioned imaging members are electrically stable for over 50,000 xerographic imaging cycles. In addition, imaging members with the aforementioned unsymmetrical squaraines of the present invention are sensitive to a board range of wavelengths, including visible and infrared light, such as of from about 400 to about 850 nanometers, enabling such members to be useful in electrophotographic imaging and printing processes, including processes wherein diode lasers are selected.

SUMMARY OF THE INVENTION

It is therefore an object of the present invention to provide certain unsymmetrical squaraine compositions and processes for the preparation thereof.

In another object of the present invention there are provided improved processes for preparing squarine compositions, which when incorporated into photoresponsive imaging members possess excellent dark decay properties, high charge acceptance values, and electrical stability.

In yet another object of the present invention there are provided simple, economical processes for preparing unsymmetrical squaraine compositions, which can be selected for layered photoconductive imaging members containing aryl amine hole transport layers.

A further object of the present invention resides in improved processes for obtaining unsymmetrical squaraine compositions of excellent sensitivity, and excellent cyclic stability when incorporated into layered imaging members with hole transport molecules.

Further, in another object of the present invention there are provided photoconductive imaging members with certain unsymmetrical squaraines, which members are simultaneously responsive to infrared light, and to visible light.

Additionally, another object of the present invention resides in the provision of imaging and printing methods with the photoconductive imaging members described herein.

These and other objects of the present invention are accomplished by the provision of certain unsymmetrical squaraine compositions, and processes for the preparation thereof. More specifically, the present invention is directed to photoconductive imaging members containing as photoconductive compositions unsymmetrical squaraines of the following formula

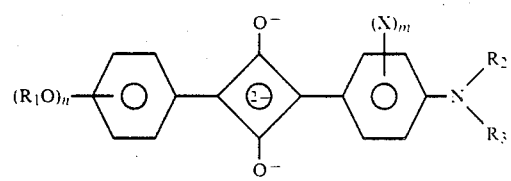

wherein $R_1$, $R_2$ and $R_3$ are independently selected from alkyl groups or aryl groups; X is hydroxy, hydrogen, alkyl, alkoxy, or halo; n is a number of from 1 to about 3; and m is a number of from 0 to about 2. Preferred halogens include fluorine and chlorine.

Examples of alkyl groups include those containing from about 1 to about 25 carbon atoms such as methyl, ethyl, propyl, butyl, pentyl, hexyl, heptyl, dodecyl and the like; while examples of aryl groups include those with from about 6 to about 24 carbon atoms including substituted aryl groups such as phenyl and benzyl. Alkoxy groups are represented by those containing from about 1 to about 10 carbon atoms such as methoxy, propoxy, butoxy, pentoxy, heptoxy, and the like, inclusive in some situations of aryl alkoxy substituents such as phenyl alkoxy. Halo includes fluoride, bromide, chloride and iodide.

Specific examples of unsymmetrical squaraines of the present invention include 4-dimethylaminophenyl-4'-methoxyphenyl squaraine; 2-hydroxy-4-dimethylaminophenyl-4'-methoxyphenyl squaraine; 2-methyl-4-dimethylaminophenyl-4'-methoxyphenyl squaraine; 2-fluoro-4-dimethylaminophenyl-4'-methoxyphenyl squaraine; 2-methoxy-4-dimethylaminophenyl-4'-methoxyphenyl squaraine; 4-benzylmethylaminophenyl-4'-methoxyphenyl squaraine; 4-dimethylaminophenyl-3',4'-dimethoxyphenyl squaraine; 2-hydroxy-4-dimethylaminophenyl-3',4'-dimethoxyphenyl squaraine; 2-methyl-4-dimethylaminophenyl-3',4'-dimethoxyphenyl squaraine; 2-fluoro-4-dimethylaminophenyl-3',4'-dimethoxyphenyl squaraine; 2-methoxy-4-dimethylaminophenyl-3',4'-dimethoxyphenyl squaraine; 4-dimethylaminophenyl-3',4',5'-trimethoxyphenyl squaraine; 2-hydroxy-4-dimethylaminophenyl-3',4',5'-trimethoxyphenyl squaraine; 2-chloro-4-dimethylaminophenyl-4'-methoxyphenyl squaraine; 2-chloro-4-dimethylaminophenyl-3',4'-dimethoxyphenyl squaraine; 4-diethylaminophenyl-4'-methoxyphenyl squaraine; and 4-diethylaminophenyl-3',4'-dimethoxyphenyl squaraine.

The squaraine compositions of the present invention are generally prepared by a cycloaddition-condensation reaction. More specifically, these squaraines are prepared by condensing, for example, a 1-alkoxyaryl-2-hydroxycyclobutene-3,4-dione derivative with an N,N-dialkylaniline derivative, such as 1-3',4'-dimethoxy-phenyl-2-hydroxycyclobutene-3,4-dione and 3-fluoro-N,N-dimethylaniline in a molar ratio of about 1 to 6, and preferably in a ratio of about 1 to 3 in the presence of an aliphatic alcohol, such as propanol, and an optional drying reagent. About 500 mililiters of alcohol per 0.1 moles of 1-alkoxyaryl-2-hydroxycyclobutene-3,4-dione are selected, however, up to about 1,000 milliliters of alcohol to about 0.5 to 1 moles of 1-alkoxyaryl-2-hydroxycyclobutene-3,4-dione can be selected. The drying reagent can be heterogeneous such as molecular sieves or homogeneous such as a trialkyl orthoformate. A ratio of 1 to 10 equivalents of drying reagent, more specifically tributyl orthoformate, can be used with a ratio of about 1 to 4 to the cyclobutene dione being preferred. Also, the reaction is generally accomplished at a temperature of about 60° C. to about 130° C., and preferably at a temperature of 70° C. to about 100° C. with stirring until the reaction is completed. Subsequently, the desired product can be isolated from the reaction mixture by known techniques such as filtration, and the product is identified by analytical tools including IR, NMR, and mass spectrometry. Further, carbon, hydrogen, fluorine, nitrogen and oxygen elemental analysis can be selected for aiding the identification of the product.

The 1-alkoxyaryl-2-hydroxycyclobutene-3,4-dione reactant can be prepared as indicated in the literature referred to herein, and specifically by a known [2+2] cycloaddition process involving a tetraalkoxy olefin and an alkoxyaryletene generated in situ by the reaction of an alkoxyarylacetyl chloride and a base. Thus, for example, 3,4-dimethoxyphenylacetyl chloride can be reacted with tetraethoxyethylene in n-hexane in the presence of triethylamine. The ratio of acid chloride to tetraethoxyethylene is about 1 to 10 with 1 to 4 being preferred. The amount of triethylamine used will vary, however, usually an amount equivalent to the amount of the acid chloride is selected, and the reaction mixture is stirred at room temperature until the reaction is complete. Also, the [2+2] cyclo adduct product mixture can be hydrolyzed directly by refluxing in an aqueous hydrochloric acid solution or pre-purified by stirring with silica gel or alumina in a solvent such as n-hexane or ether, before the hydrolysis. The hydrolyzed product is then purified by conventional technique such as recrystallization. This results in reactants such as 1-4'-methoxyphenyl-2-hydroxycyclobutene-3,4-dione, 1-3',4'-dimethoxyphenyl-2-hydroxycyclobutene-3,4-dione, 1-3',4',5'-trimethoxyphenyl-2-hydroxycyclobutene-3,4-dione, which can then be reacted with a N,N-dialkylaniline as described herein enabling the formation of the unsymmetrical squaraines of the present invention.

The squaraine compounds of the present invention can be incorporated into various photoconductive imaging members. One such member is comprised of a supporting substrate, a hole transport layer, and as a photoconductive layer situated between the supporting substrate, and the hole transport layer the squaraine compositions prepared in accordance with the process of the present invention. In another embodiment, there is envisioned a layered photoresponsive device comprised of a supporting substrate, a photoconductive layer comprised of the squaraine compound of the present invention; and situated between the supporting substrate, and the photoconductuive layer, a hole transport layer. In one specific illustrative embodiment, the photoresponsive device can be comprised of (1) a supporting substrate, (2) a hole blocking layer, (3), an optional adhesive interface layer, (4) an unsymmetrical squaraine photogenerating layer, and (5) a hole transport layer. Thus, a specific photoresponsive device of the present invention can be comprised of a conductive supporting substrate, a hole blocking metal oxide layer in contact therewith, an adhesive layer, an unsymmetrical squaraine photogenerating material overcoated on the optional adhesive layer, and as a top layer, a hole transport layer comprised of certain diamines dispersed in a resinous matrix. The photoconductive layer composition when in contact with the hole transport layer is capable of allowing holes generated by the photogenerating layer to be transported. Examples of aryl amine hole transport molecules that may be selected for the photoconductor devices are illustrated in U.S. Pat. No. 4,265,990, the disclosure of which is totally incorporated herein by reference.

The photoresponsive devices described herein can be incorporated into various imaging systems such as those conventionally known as xerographic imaging processes. Additionally, the imaging members of the present invention can be selected for imaging and printing systems with visible light and/or infrared light. In this embodiment, the photoresponsive devices may be negatively charged, exposed to light in a wavelength of from about 400 to about 850 nanometers, either sequentially or simultaneously, followed by developing the resulting image and transferring to paper. The above sequence may be repeated many times.

BRIEF DESCRIPTION OF THE DRAWINGS

For a better understanding of the features of the present invention, the following detailed description of various preferred embodiments is provided, wherein.

DESCRIPTION OF THE PREFERRED EMBODIMENTS

Preferred embodiments of the invention will now be illustrated, it being noted that substantially equivalent imaging members are also embraced within the scope of the present invention.

Figure 1:
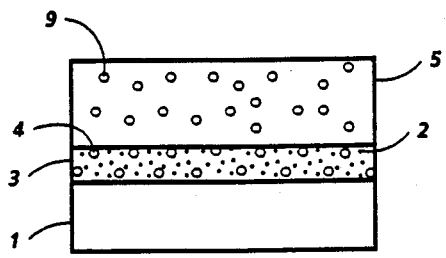
FIG. 1, 2, and 3 are partially schematic cross-sectional views of the photoconductive imaging members of the present invention.

FIG. 1 illustrates a photoconductive imaging member of the present invention comprising a supporting substrate 1, a photogenerating layer 3 comprising an unsymmetrical squaraine 2 of the formula as illustrated herein, optionally dispersed in a resinous binder composition 4, and a charge carrier hole transport layer 5, which comprises a hole transporting molecule dispersed in an inactive resinous binder composition 9.

Figure 2:
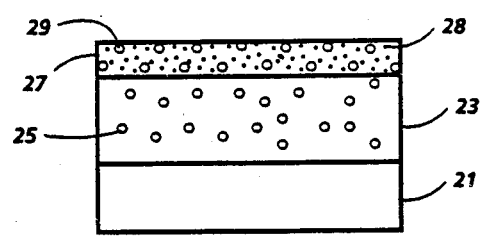

FIG. 2 illustrates essentially the same member as that shown in FIG. 1 with the exception that the hole transport layer is situated between the supporting substrate and the photogenerating layer. More specifically, this figure illustrates a photoconductive imaging member comprising a supporting substrate 21, a hole transport layer 23 comprising an aryl amine charge or hole transport composition dispersed in an inactive resinous binder composition 25, and a photogenerating layer 27 comprising an unsymmetrical squaraine 28 of the formula as illustrated herein optionally dispersed in a resinous binder composition 29.

Figure 3:
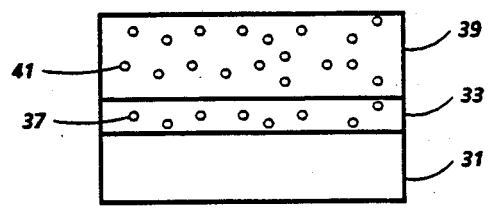

FIG. 3 illustrates a photoconductive imaging member of the present invention comprising a supporting substrate 31, a photogenerating layer 33 comprising the unsymmetrical squaraine 2-fluoro-4-dimethylaminophenyl-3',4'-dimethoxyphenyl squaraine optionally dispersed in a resinous binder composition 37, and a charge carrier hole transport layer 39, which comprises a hole transporting molecule dispersed in an inactive resinous binder composition 41.

The supporting substrate of the imaging members may comprise an insulating material such as an inorganic or organic polymeric material, including Mylar ®, a commercially available polymer; a layer of an organic or inorganic material having a semiconductive surface layer such as indium tin oxide or aluminum arranged thereon; or a conductive material such as aluminum, titanium, chromium, nickel, brass, or the like. The substrate may be flexible or rigid and may have a number of different configurations, such as a plate, a cylindrical drum, a scroll, an endless flexible belt, and the like. Preferably, the substrate is in the form of an endless flexible belt. In some situations, it may be desirable to coat an anticurl layer, such as polycarbonate materials commercially available as Makrolon ®, on the back of the substrate, particularly when the substrate is an organic polymeric material.

The thickness of the substrate layer depends on many factors, including economic considerations. Thus, this layer may be of substantial thickness, for example over 100 mils, or of minimal thickness provided that there are no adverse effects on the system. In a preferred embodiment, the thickness of this layer is from about 3 mils to about 10 mils.

Generally, the squaraine photoconductive layer has a thickness of from about 0.05 micron to about 10 microns or more, and preferably has a thickness of from about 0.1 micron to about 3 microns. The thickness of this layer, however, is dependent primarily upon the photogenerating weight loading, which may vary from about 5 to 100 percent. Generally, it is desirable to provide this layer in a thickness sufficient to absorb about 90 percent or more of the incident radiation which is directed upon it in the imagewise or printing exposure step. The maximum thickness of this layer is dependent primarily upon factors such as mechanical considerations, such as the specific squaraine compound selected, the thicknesses of the other layers, and whether a flexible photoconductive imaging member is desired.

The hole transport layer comprises an aryl amine compound dispersed in a resinous binder. Preferred aryl amine compounds include those of the formula:

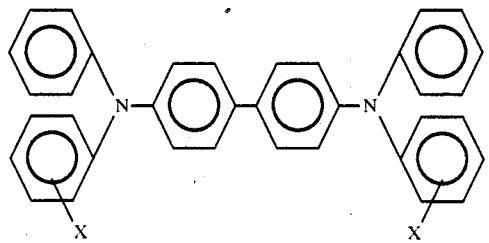

wherein X is selected from the group consisting of alkyl and halogen. Preferably, X is selected from the group consisting of methyl and chloride in either the ortho, meta, or para positions. Suitable inactive binder materials for the hole transport layer include known highly insulating resins, which generally have a resistivity of at least $10^{12}$ ohm-cm to prevent undue dark decay. The insulating resin becomes electrically active when it contains from about 10 to about 75 percent by weight of the substituted N,N,N',N'-tetraphenyl[1,1-biphenyl]4-4'-diamines corresponding to the foregoing formula. Compounds corresponding to the above formula include N,N'-diphenyl-N,N'-bis(alkylphenyl)-[1,1-biphenyl]-4,4'-diamine, wherein alkyl is selected from the group consisting of methyl, such as 2-methyl, 3-methyl and 4-methyl, ethyl, propyl, butyl, hexyl, and the like. With halo substitution, the amine is N,N'-diphenyl-N,N'-bis(halo phenyl)-[1,1'-biphenyl]-4,4'-diamine, wherein halo is 2-chloro, 3-chloro or 4-chloro. Other electrically active small molecules that can be dispersed in the electrically inactive resin to form a layer which will transport holes include bis(4-diethylamino-2-methylphenyl)phenyl methane, 4',4''-bis(diethylamino)-2',2''-dimethyltriphenyl methane, bis-4-(diethylaminophenyl)phenyl methane, and 4,4'-bis(diethylamino)-2,2'-dimethyltriphenyl methane. Generally, the hole transport layer has a thickness of from about 5 to about 50 microns, and preferably of from about 10 to about 40 microns.

Examples of the highly insulating and transparent resinous components or inactive binder resinous material for the transport layer include materials such as those described in U.S. Pat. No. 3,121,006, the disclosure of which is totally incorporated herein by reference. Specific examples of suitable organic resinous materials include polycarbonates, arcylate polymers, vinyl polymers, cellulose polymers, polyesters, polysiloxanes, polyamides, polyurethanes and epoxies as well as block, random or alternating copolymers thereof. Preferred electrically inactive binder materials are polycarbonate resins having a molecular weight of from about 20,000 to about 100,000 with a molecular weight in the range of from about 50,000 to about 100,000 being particularly preferred. Generally, the resinous binder contains from about 10 to about 75 percent by weight of the active material corresponding to the foregoing formula, and preferably from about 35 percent to about 50 percent of this material.

Similar binder materials may be selected for the squaraine photogenerating layer, including those illustrated in U.S. Pat. No. 3,121,006, the disclosure of which is totally incorporated herein by reference. A preferred class of binder material for the squaraine photogenerating layer is a poly (vinyl acetal).

The photoconductive imaging member may optionally contain a hole blocking layer situated between the supporting substrate and the photogenerating layer. This layer may comprise metal oxides, such as aluminum oxide and the like, or materials such as silanes. The primary purpose of this layer is to prevent hole injection from the substrate during and after charging. Typically, this layer is of a thickness of less than 50 Angstroms, although it may be as thick as 500 Angstroms in some instances.

In addition, the photoconductive imaging member may also optionally contain an adhesive interface layer situated between the hole blocking layer and the photogenerating layer. This layer may comprise a polymeric material such as polester, polyvinyl butyral, polyvinyl pyrrolidone and the like. Typically, this layer is of a thickness of less than about 0.6 micron.

Imaging members of the present invention exhibit superior xerographic properties. For example, values for dark development potential ($V_{ddp}$) range from about $-400$ to about $-975$. Preferred ranges for dark development potential for the imaging members of the present invention are usually about $-400$ to $-500$ volts, with $-800$ volts being especially preferred. High dark development potentials permit high contrast potentials, which result in images of high quality with essentially no background development.

The imaging members of the present invention also exhibit low dark decay values of about $-50$ volts per second or less. Low dark decay values are of importance for developing high quality images since dark decay measures the amount of charge that disappears after charging of the photoreceptor, and a large difference in charge between exposed and unexposed areas of the photoreceptor results in images with desirable high contrast. Acceptable values for dark decay vary depending on the design of the imaging apparatus in which the imaging members are contained. This dark decay may be as high as $-100$ volts per second with $-50$ volts, and $-10$ to $-20$ volts per second being preferred.

Residual potential values ($V_R$) for the imaging members of the present invention are also superior, ranging from about $-5$ volts to $-50$ volts. Residual potential is a measure of the amount of charge remaining on the imaging member after erasure by exposure to light and prior to imaging. Residual potentials of $-5$ to $-10$ are considered exceptional.

Photosensitivity values ($E_{0.5\ ddp}$ at 600 nanometers) for the imaging members of the present invention are excellent, and range from about 2.4 to 11.9 ergs per square centimeter. Acceptable photosensitivity values vary depending on the design of the imaging apparatus in which the imaging members are contained; thus in some instances, values as high as 40 or 50 are acceptable, and values of about 5 are preferred.

The present invention also encompasses a method of generating images with the photoconductive imaging members disclosed herein. The method comprises the steps of generating an electrostatic image on a photoconductive imaging member of the present invention, subsequently developing the electrostatic image with known developer compositions comprised of resin particles, pigment particles, additives, including charge control agents and carrier particles, reference U.S. Pat. Nos. 4,558,108; 4,560,535; 3,590,000; 4,264,672; 3,900,588; and 3,849,182, the disclosures of each of these patents being totally incorporated herein by reference, transferring the developed electrostatic image to a suitable substrate, and permanently affixing the transferred image to the substrate. Development of the image may be achieved by a number of methods, such as cascade, touchdown, powder cloud, magnetic brush, and the like. Transfer of the developed image to a substrate may be by any method, including those wherein a corotron or a biased roll is selected. The fixing step may be performed by means of any suitable method, such as flash fusing, heat fusing, pressure fusing, vapor fusing, and the like.

The following examples are being supplied to further define various species of the present invention, it being noted that these examples are intended to illustrate and not limit the scope of the present invention. Parts and percentages are by weight unless otherwise indicated.

EXAMPLE I 1-p-methoxyphenyl-2-hydroxycyclobutene-3,4-dione was synthesized according to the procedure reported by Bellus (J. Am. Chem. Soc., 100, 8026 (1978)), the disclosure of which is totally incorporated herein by reference. A slight modification to the aforesaid process was accomplished.

Tetraethoxyethylene, which was freshly synthesized using the procedure of Bellus et al. (Helv. Chim. Acta., 63, 1130 (1980)), (59.6 grams, 0.29 mole), triethylamine (63.7 grams), and n-hexane (1,350 milliliters) were discharged in a 3 liter three-neck flask which was equipped with a mechanical stir and a nitrogen inlet. 4-methoxyphenylacetyl chloride (113.1 grams, 0.61 mole) was added slowly through a pressure equalizing funnel in a two hour period. White precipitate of triethylamine hydrochloride was formed during the addition. After the addition was completed, the mixture was stirred at room temperature for about 4 hours. Subsequently, the resulting mixture was warmed by a water bath (about 60° C.) for 0.5 hour through a 1.5 liter medium sintered glass funnel. The solid obtained was washed with warm n-hexane (3×1,300 milliliters), and the n-hexane solutions were combined. After removing the solvent under reduced pressure, a light yellow liquid 96.4 grams was resulted. This yellow liquid was then dissolved in about 3,500 milliliters of ether, 1,000 grams of basic alumina (from Fisher, activity III) was added, and the resulting slurry was stirred for 6 hours. The slurry was filtered and the alumina was washed thoroughly with either. After evaporating the solvent, 73 grams yellow liquid was obtained. This yellow liquid was hydrolyzed with 400 milliliters, 18 percent hydrochloric acid at reflux for 4 hours. The hydrochloric acid was evaporated under reduced pressure. The residue, a brown gummy solid, was then digested with n-hexane on a steambath resulting in a brown solid product. This crude product was then recrystallized from a mixture of toluene and acetone, to yield 35 grams of the above desired product (57 percent), m.p.: 221° to 223° C.; IR(KBr): 1,723 and 1,794 cm$^{-1}$ (C=O); NMR (acetone-d$_6$)$\delta$3.91 (s,3H, OCH$_3$), 7.17 (d, 2H,J=9.4 Hz), and 8.07 (d, 2H,J=9.4 Hz); MS(m/z)204(M+).

EXAMPLE II 1-3',4'-dimethoxyphenyl-2-hydroxycyclobutene-3,4-dione, 42 percent yield, was prepared according to the procedure as described in Example I with the exception that the alumina treatment was omitted. There resulted a product with an m.p.: 238° to 239° C.; IR(KBr): 1,713 and 1,790 cm$^{-1}$; NMR(acetone-d$_6$)$\delta$3.91 (s, 3H, OCH$_3$), 3.94 (s, 3H, OCH$_3$), 7.17 (d, 1H,J=7.9 Hz), 7.64 (d, 1H,J=2 Hz), and 7.75 (ABq, 1H,J$_A$=7.9 Hz,J$_B$=2 Hz); and MS(m/z):234(M+).

Analysis Calculated for: C$_{12}$H$_{10}$O$_5$:C61.54,H4.30; Found: C61.30,H4.41.

EXAMPLE III 1-3',4',5'-trimethoxyphenyl-2-hydroxycyclobutene-3,4-dione was synthesized according to the procedure as described in Example II. There resulted a product with a yield of 30 percent, m.p.: 202.5° to 204.0° C.; IR(KBr): 1,728 and 1,790 cm$^{-1}$; NMR (acetone-d$_6$)$\delta$3.91 (s, 3H, OCH$_3$), 3.94 (s, 6H, OCH$_3$), and 7.65 (s, 2H); MS (m/z): 264(M+).

Analysis Calculated for: $C_{13}H_{12}O_6$ C59.09,H4.58; Found: C,58.90,H4.78.

EXAMPLE IV 4-dimethylaminophenyl-4'-methoxyphenyl squaraine was prepared by reacting 1-p-methoxyphenyl-2-hydroxycyclobutene-3,4-dione of Example I with N,N-dimethylaniline in refluxing 2-propanol in the presence of tributyl orthoformate. Initially, there was formed an organic salt by mixing equivalent amounts, 10.2 grams of 1-p-methoxyphenyl-2-hydroxycyclobutene-3,4-dione and 6.1 grams of N,N-dimethylaniline in tetrahydrofuran, followed by solvent evaporation. The resulting salt (0.41 gram, 1.25 millimoles) was supended in 10 milliliters of 2-propanol containing 1 milliliter of tributyl orthoformate. Subseuqently, the mixture was stirred and refluxed under a nitrogen atmosphere enabling the salt to solubilize. After 90 minutes of refluxing, the reaction mixture was cooled to an ice cold temperature. The precipitated squaraine product, which was isolated by filtration, was then washed with 1 to 2 milliliters of cold 2-propanol and about 10 milliliters of diethyl ether. After vacuum drying, there was obtained 0.26 gram (67 percent) of a purple blue solid, identified as 4-dimethylaminophenyl-4'-methoxyphenyl squaraine, which solid product had an m.p.: 212° to 214° C.

Analysis Calculated for: $C_{19}H_{17}NO_3$: C74.25,H5.58,N4.56, Found: C74.07,H5.78,N4.54.

EXAMPLE V

The process of Example IV was repeated with the exception that 3-hydroxy-N,N-dimethylaniline was selected in place of N,N-dimethylaniline, yielding 2-hydroxy-4-dimethylaminophenyl-4'-methoxyphenyl squaraine, 0.33 gram (82 percent), m.p. 261° to 262° C.

Analysis Calculated for $C_{19}H_{17}NO_4$: C70.58,H5.30,N4.33; Found: C70.38,H5.28,N4.33.

EXAMPLE VI

The process of Example IV was repeated with the exception that 3-methyl-N,N-dimethylaniline was used in the place of N,N-dimethylaniline, yielding 2-methyl-4-dimethylaminophenyl-4'-dimethylaminophenyl squaraine, 0.29 gram (73 percent), m.p. 209° to 211° C.

Analysis Calculated for $C_{20}H_{19}NO_3$: C74.74,H5.96,N4.36; Found: C74.81,H5.80,N4.31.

EXAMPLE VII

The process of Example IV was repeated with the exception that 3-fluoro-N,N-dimethylaniline was selected in place of N,N-dimethylaniline, yielding 2-fluoro-4-dimethylaminophenyl-4'-methoxyphenyl squaraine, 0.13 gram (32 percent), m.p. 214° to 216° C.

Analysis Calculated for $C_{19}H_{16}NO_3F$: C70.14,H4.96,N4.31,F5.84; Found: C69.54,H4.83,N4.27,F5.56.

EXAMPLE VIII

The process of Example IV was repeated with the exception that 3-methoxy-N,N-dimethylaniline was selected in place of N,N-dimethylaniline, yielding 2-methoxy-4-dimethylaminophenyl-4'-methoxyphenyl squaraine, 0.18 gram (43 percent), m.p. 209° to 213° C.

Analysis Calculated for $C_{20}H_{19}NO_4$: C71.20,H5.68,N4.15; Found: C70.56,H5.74,N3.97.

EXAMPLE IX

The process of Example IV was repeated with the exception that N-methyl-N-benzylaniline was selected in place of N,N-dimethylaniline, yielding 4-methylbenzylaminophenyl-4'-methoxyphenyl squaraine, 0.19 gram (41 percent), m.p. 198.5° to 199.5° C.

Analysis Calculated for $C_{25}H_{21}NO_3$: C78.31,H5.52,N3.65; Found: C77.95,H5.59,N4.09.

EXAMPLE X

The process of Example IV was repeated with the exception that 1-3',4'-dimethoxyphenyl-2-hydroxycyclobutene-3,4-dione was selected in place of 1-4'-methoxyphenyl-2-hydroxycyclobutene-3,4-dione, yielding 4-dimethylaminophenyl-3',4'-dimethoxyphenyl squaraine, and 3-hydroxy-N,N-dimethylaniline was selected in place of the aniline, 0.34 gram (77 percent). m.p. 215° to 219° C.

Analysis Calculated for $C_{20}H_{19}NO_4$: C71.20,H5.68,N4.15; Found: C71.01,H5.69,N4.73.

EXAMPLE XI

The process of Example IV was repeated with the exception that 1-3',4'-dimethoxyphenyl-2-hydroxycyclobutene-3,4-dione was selected in place of 1-4'-methoxyphenyl-2-hydroxycyclobutene-3,4-dione, and 3-hydroxy-N,N-dimethylaniline, yielding 2-hydroxy-4-dimethylaminophenyl-3',4'-dimethoxyphenyl squaraine, 0.40 gram (85 percent), m.p. 249° to 250° C.

Analysis Calculated for $C_{20}H_{19}NO_5$: C67.98,H5.42,N3.96; Found: C67.29,H5.40,N3.82.

EXAMPLE XII

The process of Example IV was repeated with the exceptions that 1-3',4'-dimethoxyphenyl-2-hydroxycyclobutene-3,4-dione and 3-methyl-N,N-dimethylaniline were selected in place of 1-4'-methoxyphenyl-2-hydroxycyclobutene-3,4-dione, and N,N-dimethylaniline yielding 2-methyl-4-dimethylaminophenyl-3',4'-dimethoxyphenyl squaraine, 0.38 gram (81 percent), m.p. 223° to 225° C.

Analysis Calculated for $C_{21}H_{21}NO_4$: C71.78,H6.02,N3.99; Found: C71.94,H6.29,N3.88.

EXAMPLE XIII

The process of Example IV was repeated with the exceptions that 1-3',4'-dimethoxyphenyl-2-hydroxycyclobutene-3,4-dione and 3-fluoro-N,N-dimethylaniline were selected in place of 1-4'-methoxyphenyl-2-hydroxycyclobutene-3,4-dione, and N,N-dimethylaniline yielding 2-fluoro-4-dimethylaminophenyl-3',4'-dimethoxyphenyl squaraine, 0.26 gram (59 percent). m.p. 217° to 220° C.

Analysis Calculated for $C_{20}H_{18}NO_4F$: C67.60,H5.10,N3.94,F5.35; Found: C67.47,H5.26,N3.85,F3.56.

EXAMPLE XIV

The process of Example IV was repeated with the exceptions that 1-3',4'-dimethoxyphenyl-2-hydroxycyclobutene-3,4-dione and 3-methoxy-N,N-dimethylaniline were used in place of the methoxyphenyl-2-hydroxycyclobutene-3,4-dione, and N,N-dimethylaniline yielding 2-methoxy-4-dimethylaminophenyl-3',4'-dimethoxyphenyl squaraine, 0.24 gram (52 percent), m.p. 216° to 218° C.

Analysis Calculated for $C_{21}H_{21}NO_5$: C68.65,H5.76,N3.81; Found: C67.94,H6.15,N3.64.

EXAMPLE XV

One gram of the organic squaraine salt prepared in Example V was placed in a solvent mixture containing 50 milliliters of benzene and 3 milliliters of 1-butanol. The mixture was brought to reflux for 4 hours. The product mixture was cooled. The product, 2-hydroxy-4-dimethylaminophenyl-4'-methoxyphenyl squaraine was isolated by filtration, yield 0.85 gram (75 percent). The product was identified in accordance with the procedure of Example V, and by IR and NMR, and substantially identical results were obtained.

EXAMPLE XVI 3-hydroxy-N,N-dimethylaniline (0.59 gram) and 1-3',4'-dimethoxyphenyl-2-hydroxycyclobutene-3,4-dione (1.0 gram) were charged in a 100 milliliter round bottom flask containing 35 milliliters of 1-butanol and 35 milliliters of benzene. The mixture was brought to reflux for 4 hours, followed by cooling to room temperature. The product 2-hydroxy-4-dimethylaminophenyl-3',4'-dimethoxyphenyl squaraine was isolated by filtration, yield 1.18 gram (78 percent), which product was identified in accordance with the procedure of Example XV, and substantially identical results were obtained.

EXAMPLE XVII 3-hydroxy-N,N-dimethylaniline (0.52 gram) and 1-3',4',5'-trimethoxyphenyl-2-hydroxycyclobutene-3,4-dione (1.0 gram) were reacted as described in Example XVI, yielding 2-hydroxy-4-dimethylaminophenyl-3',4',5'-trimethoxyphenyl squaraine, 0.74 gram (51 percent), m.p. 236° to 237° C.

Analysis Calculated for $C_{21}H_{21}NO_6$: C65.79,H5.52,N3.65; Found: C66.39,H5.65,N3.58.

EXAMPLE XVIII 1-3',4',5'-trimethoxyphenyl-2-hydroxycyclobutene-3,4-dione (0.15 gram) and N,N-dimethylaniline (0.07 gram) were charged in a 100 milliliter flask containing 0.5 milliliter tributyl orthoformate and 5 milliliters 2-propanol. The mixture was brought to reflux for about 2 hours, followed by cooling to room temperature. A purple solid, which was identified as 4-dimethylaminophenyl-3',4',5'-trimethoxyphenyl squaraine was isolated by filtration, yield 0.12 gram (57 percent), m.p. 205° to 208° C.

Analysis Calculated for $C_{21}H_{21}NO_5$: C68.65,H5.76,N3.81; Found: C68.21,H5.67,N4.05.

EXAMPLE XIX

There was prepared a photoresponsive device containing as the photoconductive material the squaraine as prepared in accordance with Example XIII, and as a charge transport layer an aryl amine dispersed in a resinous binder. Specifically, there was prepared a photoresponsive device by providing a ball grained aluminum substrate of a thickness of 150 microns, followed by applying thereto with a multiple clearance film applicator, in a wet thickness of 0.5 mil, a layer of N-methyl-3-aminopropyltrimethoxysilane, available from PCR Research Chemicals, Florida, in ethanol in a 1:20 volume ratio. This layer was then allowed to dry for 5 minutes at room temperature, followed by curing for 10 minutes at 110° C. in a forced air oven.

A photoconductive layer containing 80 percent by weight of 2-fluoro-4-dimethylaminophenyl-3',4'-dimethoxyphenyl squaraine, and 20 percent by weight of polyvinyl formal was then prepared as follows:

In a separate 2 ounce amber bottle, there was added 0.21 gram of the above squaraine, 0.05 gram of poly(vinyl formal) (from Scientific Polymer Products, Inc.), formal content 82 percent, acetate content 12 percent, hydroxy content 6 percent, 85 grams of ⅛ inch stainless steel shots and 10 milliliters of methylene chloride. The above mixture was placed on a ball mill for 24 hours. The resulting slurry was then coated on the aluminum substrate using a 0.5 mil wet-gap Bird film applicator. The layer was then air dried for 5 minutes, and at 135° C. for 10 minutes in a forced air oven. The dry thickness of the squaraine layer was about 0.5 microns.

The above photoconductive layer was then overcoated with a charge transport layer, which was prepared as follows:

A transport layer composed of 50 percent by weight Makrolon ®, a polycarbonate resin available from Larbensabricken Bayer A.G., was mixed with 50 percent by weight of the aryl armine N,N'-bis(3-methylphenyl)-1,1'biphenyl-4,4'-diamine. This solution was mixed to 9 percent by weight in methylene chloride. All of these components were placed in an amber bottle and dissolved. The mixture was coated to give a layer with a dry thickness of 30 microns over the above squaraine photoconductive layer, using a multiple clearance film applicator (15 mils wet gap thickness). The resulting device was then air dried at room temperature for 20 minutes, followed by drying in a forced air oven at 135° C. for 6 minutes.

The above photoreceptor device was then incorporated into a xerographic imaging test fixture. There resulted, subsequent to development with toner particles containing a styrene n-butylmethacrylate resin, 88 percent, 10 percent of carbon black, and 2 percent by weight of the charge enhancing additive cetyl pyridinium chloride, images of excellent resolution and high quality with substantially no background deposits, after heat fixing.

EXAMPLE XX

A photoconductive imaging member was prepared by providing a titanized Mylar substrate in a thickness of 3 mils and applying thereto a layer of silane as described in Example XIX, and then a layer of 0.5 percent by weight of duPont 49,000 adhesive, a polyester available from duPont, in methylene chloride and 1,1,2-trichloroethane (4:1 volume ratio) with a Bird Applicator to a wet thickness of 0.5 mil. The layer was allowed to dry for one minute at room temperature, and 10 minutes at 100° C. in a forced air oven. The resulting layer had a dry thickness of 0.5 micron.

In a 2 ounce amber bottle, there was added 0.21 gram of 2-fluoro-4-dimethylaminophenyl-3',4'-dimethoxyphenyl squaraine, 0.05 gram of poly(vinyl butyral) (from Scientific Polymer Products, Inc.), butyral content 88 percent, acetate content 1 percent, hydroxy content 11 percent, 85 grams of ⅛ inch stainless steel shots and 10 milliliters methylene chloride. The above mixture was placed on a ball mill for 24 hours. The resulting slurry was then coated on the titanized substrate using a 1.0 mil wet-gap Bird Film Applicator. The layer was then air dried for 5 minutes and at 135° C. for 10 minutes in a forced air oven. The dry thickness of the squaraine layer was about 0.5 micron.

The above photoconductive layer was then overcoated with a charge transport layer, which was prepared as follows:

A transport layer composed of 50 percent by weight Makrolon ®, a polycarbonate resin available from Larbensabricken Bayer A.G., was mixed with 50 percent by weight N,N'-bis(3-methylphenyl)-1,1'-biphenyl-4,4'-diamine. This solution was mixed to 9 percent by weight in methylene chloride. All of these components were placed in an amber bottle and dissolved. The mixture was coated to give a layer with a dry thickness of 30 microns over the above squaraine photoconductive layer, using a multiple clearance film applicator, 15 mils wet gap thickness. The resulting device was then air dried at room temperature for 20 minutes, followed by drying in a forced air oven at 135° C. for 6 minutes.

The above photoreceptor device was then incorporated into a xerographic imaging test fixture. There resulted, subsequent to development with toner particles containing a styrene n-butylmethacrylate resin, 88 percent, 10 percent of carbon black, and 2 percent of cetyl pyridinium chloride, and fixing by heat, images of excellent resolution, and high quality with substantially no background deposits.

Further, photoresponsive devices can be prepared by repeating the procedure of Examples XIX and XX with the exception that there was selected as the squaraine photoconductive composition 4-dimethylaminophenyl-4'-methoxyphenyl squaraine; 2-hydroxy-4-dimethylaminophenyl-4'-methoxyphenyl squaraine; 2-methyl-4-dimethylaminophenyl-4'-methoxyphenyl squaraine; 2-fluoro-4-dimethylaminophenyl-4'-methoxyphenyl squaraine; 2-methoxy-4-dimethylaminophenyl-4'-methoxyphenyl squaraine; 4-benzylmethylaminophenyl-4'-methoxyphenyl squaraine; 4-dimethylaminophenyl-3',4'-dimethoxyphenyl squaraine; 2-hydroxy-4-dimethylaminophenyl-3',4'-dimethoxyphenyl squaraine; 2-methyl-4-dimethylaminophenyl-3',4'-dimethoxyphenyl squaraine; 2-fluoro-4-dimethylaminophenyl-3',4'-dimethoxyphenyl squaraine; 2-methoxy-4-dimethylaminophenyl-3',4'-dimethoxyphenyl squaraine; 4-dimethylaminophenyl-3',4',5'-trimethoxyphenyl squaraine; and 2-hydroxy-4-dimethylaminophenyl-3',4',5'-trimethoxyphenyl squaraine.

The devices as prepared in Examples XIX and XX were then tested for photosensitivity in the visible infrared region of the spectrum by negatively charging the devices with corona to $-800$ volts, followed by simultaneously exposing each device to monochromic light from a tungsten lamp in the wavelength region of about 400 to about 850 nanometers. The photoresponsive devices had excellent response, that is the devices discharged from $-800$ volts to about a $-100$ volts at 10 ergs/cm$^2$ in the wavelength region of from about 400 to about 850 nanometers, indicating both visible and infrared photosensitivity for these members.

Other modifications of the present invention will occur to those skilled in the art subsequent to a review of the present application. These modifications, and equivalents thereof are intended to be included within the scope of this invention.

What is claimed is:

1. Unsymmetrical squaraine compositions of the formula

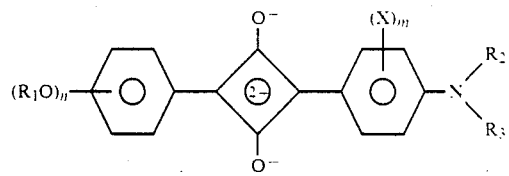

wherein $R_1$, $R_2$ and $R_3$ are independently $C_1$–$C_{25}$ alkyl; X is selected from hydrogen, hydroxy, $C_1$–$C_{25}$ alkyl, $C_1$–$C_{10}$ alkoxy. or halogen n is a number of 1 to about 3; and m is a number of from 0 to about 2.

2. Squaraine compositions selected from the group consisting of 4-dimethylaminophenyl-4'-methoxyphenyl squaraine; 2-hydroxy-4-dimethylaminophenyl-4'-methoxyphenyl squaraine; 2-methyl-4-dimethylaminophenyl-4'-methoxyphenyl squaraine; 2-fluoro-4-dimethylaminophenyl-4'-methoxyphenyl squaraine; 2-methoxy-4-dimethylaminophenyl-4'-methoxyphenyl squaraine; 4-benzylmethylaminophenyl-4'-methoxyphenyl squaraine; 4-dimethylaminophenyl-3',4'-dimethoxyphenyl squaraine; 2-hydroxy-4-dimethylaminophenyl-3',4'-dimethoxyphenyl squaraine; 2-methyl-4-dimethylaminophenyl-3',4'-dimethoxyphenyl squaraine; 2-fluoro-4-dimethylaminophenyl-3',4'-dimethoxyphenyl squaraine; 2-fluoro-4-dimethylaminophenyl-3',4'-dimethoxyphenyl squaraine; 2-methoxy-4-dimethylaminophenyl-3',4'-dimethoxyphenyl squaraine; 4-dimethylaminophenyl-3',4',5'-trimethoxyphenyl squaraine; and 2-hydroxy-4-dimethylaminophenyl-3',4',5'-trimethoxyphenyl squaraine.

3. An unsymmetrical squaraine in accodance with claim 1 wherein $R_1$, $R_2$, and $R_3$ are alkyl groups of from about 1 to about 6 carbon atoms.

4. An unsymmetrical squaraine in accordance with claim 1 wherein the alkoxy is methoxy, and the alkyl groups are methyl.

* * * * *